United States Patent [19]
McLaren

[11] Patent Number: 6,058,240
[45] Date of Patent: *May 2, 2000

[54] HDTV TRICK PLAY STREAM DERIVATION FOR VCR

[75] Inventor: David Lionel McLaren, Mountain View, Calif.

[73] Assignee: Thomson Licensing S.A., Boulogne Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/817,257
[22] PCT Filed: Sep. 29, 1995
[86] PCT No.: PCT/US95/12420
  § 371 Date: Apr. 11, 1997
  § 102(e) Date: Apr. 11, 1997
[87] PCT Pub. No.: WO96/13122
  PCT Pub. Date: May 2, 1996

[30] Foreign Application Priority Data

Oct. 20, 1994 [GB] United Kingdom ................... 9421206

[51] Int. Cl.$^7$ ............................. H04N 5/783; H04N 5/92
[52] U.S. Cl. .............................................. 386/68; 386/111
[58] Field of Search ........................ 386/6–8, 33, 68–70, 386/81–82, 124, 111, 125–126; H04N 5/783, 5/92

[56] References Cited

U.S. PATENT DOCUMENTS

| | | | |
|---|---|---|---|
| 4,489,351 | 12/1984 | D'Alayer De Costermore D'Arc | 358/906 |
| 5,589,993 | 12/1996 | Naimpally | 386/81 |
| 5,717,816 | 2/1998 | Boyce et al. | 386/111 |
| 5,729,649 | 3/1998 | Lane et al. | 386/68 |

*Primary Examiner*—Thai Tran
*Attorney, Agent, or Firm*—Joseph S. Tripoli; Joseph J. Laks; Harvey D. Fried

[57] ABSTRACT

A consumer digital video cassette recorder (210) may record an advanced television signal (09) having an MPEG like signal format. The predictive nature of the MPEG like signal format requires that additional I frame data be generated and recorded together with a normal a play speed data stream (10) to facilitate non-standard speed, or trick play reproduction. Additional I frame data streams (121, 131, 141) are generated specifically for each replay speed and are written within recorded tracks to facilitate reproduction at the predetermined speeds. Various inventive methods for the derivation of full resolution and reduced resolution trick play data streams are disclosed. Inventive trick play data stream generation is disclosed for real time recording by consumer apparatus and non-real time normal and trick play data stream generation for use with pre-recorded digital media,

7 Claims, 3 Drawing Sheets

HDTV TRICK PLAY STREAM DERIVATION FOR VCR

This invention relates to the field of digital video recording, and in particular to the derivation, recording and reproduction of MPEG like advanced television signals at non-standard speeds.

BACKGROUND OF THE INVENTION

A digital video cassette recorder employing a helical scanning format has been proposed by a standardization committee. The proposed standard specifies digital recording of standard definition SD television signals, for example, NTSC or PAL, and high definition television signals having an MPEG compatible structure, such as a proposed Grand Alliance or GA signal. The SD recorder utilizes a compressed component video signal format employing intra field/frame DCT with adaptive quantization and variable length coding. The SD digital VCR or DVCR may digitally record either NTSC or PAL television signals and has sufficient data recording capability to record an advanced television signal.

A specification of the GA signal is included in a draft specification document titled Grand Alliance HDTV System Specification, published in the 1994 Proceeding of the 48th Annual Broadcast Engineering Conference Proceedings, Mar. 20–24 1994. The GA signal employs an MPEG compatible coding method which utilizes an intra-frame coded picture, termed I frame, a forward predicted frame, termed a P frame and a bidirectionally predicted frame, termed a B frame. These three types of frames occur in groups known as GOPs or Groups Of Pictures. The number of frames. in a GOP is user definable but may comprise, for example, 15 frames. Each GOP contains one I frame, which may be abutted by two B frames, which are followed by a P frame.

In an analog consumer VCR, "Trick Play" or TP features such as picture in forward or reverse shuttle, fast or slow motion, are readily achievable, since each recorded track typically contains one television field. Hence, reproduction at speeds other than standard, may result in the reproducing head, or heads, crossing multiple tracks and recovering recognizable picture segments. The picture segments may be abutted and provide a recognizable and useful image. An advanced television or MPEG like signal may comprise groups of pictures or GOPs. The GOP may, for example, comprise 15 frames and each frame may be recorded occupying multiple tracks on tape. For example, if 10 tracks are allocated to each frame, then a 15 frame GOP will comprise 150 tracks. During play speed operation, I frame data is recovered which enables the decoding and reconstruction of the predicted P and B frames. However, when a DVCR is operated at a non-standard reproduction speed, the replay heads transduce sections or segments from the multiple tracks. Unfortunately these DVCR tracks no longer represent discrete records of consecutive image fields. Instead these segments contain data resulting mainly from predicted frames. However, since predicted P and B frames require preceding data to facilitate decoding the possibility of reconstructing any usable frames from the reproduced pieces of data is greatly diminished. In addition the MPEG data stream is particularly unforgiving of missing or garbled data. Thus to provide "Trick Play" or non-standard speed replay features requires that specific data be recorded, which when reproduced in a TP mode, is capable of image reconstruction without the use of adjacent or preceding frame information. The specific data, or "Trick Play" data must be semantically correct to allow MPEG decoding. In addition, a selection of "Trick Play" speeds, may require different TP data derivation and may require TP speed specific recorded track locations.

To be capable of reconstruction without preceding frame data requires that "Trick Play" specific data be derived from I frames. The "Trick Play" specific data must be syntactically and semantically correct to allow decoding, for example, by a GA or MPEG compatible decoder. In addition the "Trick Play" or TP data must be inserted into the MPEG like data stream for recording together with the normal play, MPEG like signal. This sharing of the recording channel data capacity may impose constraints in terms of TP data bit rate which may be provided within the available track capacity. The TP data bit rate may be variously utilized or shared between spatial and or temporal resolution in the derived or reconstructed TP image.

Reproduced "Trick Play" image quality may be determined by the complexity of the TP data derivation. For example, a consumer DVCR must derive TP data during recording, essentially in real-time and with only nominal additional data processing expense added to the DVCR cost. Thus real-time consumer DVCR "Trick Play" image quality may appear inferior to TP image data derived by non-real time image processing utilizing sophisticated digital image processing. With non-real time TP image processing for example, an edited program may be processed, possibly on a scene by scene basis, possibly at non-real-time reproduction speeds, to enable the use of sophisticated digital image processing techniques. Such non-real time processing may inherently provide higher quality "Trick Play" images than that attainable with real time processing.

SUMMARY OF THE INVENTION

A method for generating an MPEG compatible digital image representative signal which when recorded facilitates reproduction at more than one speed. The method comprises the steps of: receiving a data stream comprising an MPEG compatible digital image representative signal; decoding the data stream to extract intra-coded data; storing specific coefficients extracted from the intra-coded data to form a reduced bit rate intra-coded frame; periodically selecting the reduced bit rate intra-coded frame to form a bit stream specific to a trick play speed; selecting between the bit stream specific to the trick play speed and the data stream to produce a record formatted bit stream; and, recording the record formatted bit stream.

DETAILED DESCRIPTION

In a consumer digital video cassette recorder major considerations in the real-time generation of a trick-play stream are the complexity and cost of processing required, and the need to keep this cost at a reasonable level. For this reason, the processing utilized in the generation of a real-time trick-play data stream may be limited to extracting pieces of the existing bit stream and implementing minor modifications to bit-stream parameters.

"Trick-play" data streams must be produced in real-time by extracting independent intra-information pieces from the original data stream. This intra-information may come from intra-frames, intra-slices, and/or intra-macroblocks. The source selected for I frame data derivation depends on the form of intra refresh employed in the original stream, and for exemplary purposes it is assumed that either intra-frame or intra-slice refresh method is employed.

In a first inventive method of real-time generation, a low spatial resolution "Trick Play" data stream is derived. The low spatial resolution trick-play stream may, for example, have resolution according to the CCIR 601 standard, (720× 480 pixels), regardless of the original HDTV stream resolution. Since the effective available bit-rate for trick-play streams is limited to nominally 2M. bits/sec., employing low spatial resolution in this manner results in fewer bits being used per frame, and thus a relatively high temporal resolution may be achieved. However, this low spatial resolution may only be practical if an advanced television decoder and display are capable of such resolution.

In a second inventive method a trick-play stream is generated having the same resolution, or pixel count, as the original HDTV material. However, since the usable trick-play bit-rate is limited by the recording channel capacity of nominally 2M. bits/sec., a trade-off exists between spatial and temporal resolution. Thus the provision of a full spatial resolution "Trick Play" mode effectively requires that the temporal resolution be reduced to remain commensurate with the TP data channel capacity.

Figure 1:
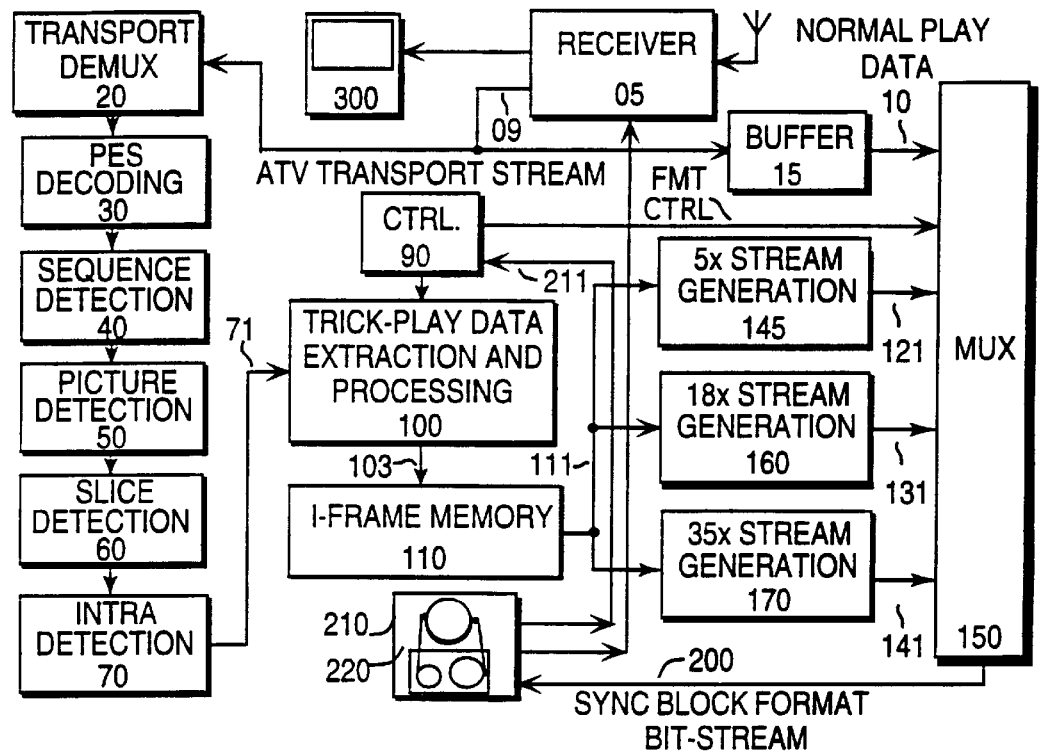
FIG. 1 is a simplified block diagram of an inventive system for the real-time generation of a "trick-play" data stream having low resolution.

The first inventive method for real-time generation of a low spatial resolution "Trick Play" data is illustrated in FIG. 1. In this exemplary block diagram, trick-play speeds of 5×, 18× and 35× are generated. For each TP speed, low-resolution, intra-coded frames are constructed from a received MPEG like transport stream. By detecting MPEG header information in the transport stream down to the slice level, intra slices can be extracted, processed and used to create a single I-frame in memory 110. The extraction and processing stage 100 performs three tasks; extracting macroblocks for the construction of a TP I-frame, re-encoding DC transform coefficients when necessary using DPCM encoding, and discarding unwanted AC transform coefficients when necessary. Having constructed and stored a low-resolution TP I-frame in memory 110, it is utilized in the generation of speed specific data streams for each trick-play speed.

A radio frequency carrier, modulated responsive to an MPEG compatible signal, is received by receiver 05. The modulated carrier may be sourced from either an antenna or a cable, not shown. Receiver 05 demodulates and processes the received carrier to produce an MPEG compatible advanced television transport stream 09.

The advanced television transport stream 09, is demultiplexed in block 20 to obtain only the Packetized Elemental Stream or PES stream corresponding to the advanced television video information. The PES stream is decoded in block 30 to extract from the packets, the MPEG encoded video stream payload. Having extracted the MPEG encoded stream, the required intra-coded information may be detected and extracted. Sequence detection block 40 examines the bit stream for the occurrence of a start code characterized by twenty five 0's followed by 1, followed by an 8 bit address indicating MPEG video header. Picture detection is performed in block 50 and in block 60 slice layers are detected. Since an intra coded "trick-play" I frame is to be constructed only intra-slices are extracted. Intra-slices contain only intra-coded macroblocks, and are characterized by a 1-bit intra_slice flag in the slice header. Thus when the intra_slice flag is set to 1 the entire slice is passed to the "data extraction and processing" stage 100. The intra detection process of block 70 assumes that either intra-frame or intra-slice refresh techniques are employed and also that the intra-slice flag in the slice header is set when appropriate. If the intra_slice flag is not set or intra-macroblock refresh is used then a further level of detection down to macroblock level is required.

The data extraction and processing stage 100 selects from the intra-coded macroblocks extracted in block 70, only intra information which is utilized for constructing various trick-play data streams. In addition block 100 performs any processing which may be necessary to ensure the syntactic and semantic correctness for MPEG compatibility of the resulting reconstructed TP I-frame. Since the reconstructed TP I-frame is of lower spatial resolution than the original MPEG stream, only a sub-set of the detected intra-macroblocks is required. To determine which macroblocks or MBs are to be kept and which are to be discarded, either a mathematical function or a predefined look-up table may be employed. The resulting lower spatial resolution frame results from the selected patchwork of macroblocks. A controller stage 90 is coupled to processing stage 100 and provides either, calculation required by the mathematical function or provides the look up table for determining macroblock selection.

The relationship between the MB position in the new low-resolution I-frame, (mb(i, j), i=0, 1, 2, . . . n-1, j=0, 1, 2, . . . m-1, where m and n are the new I-frame width and height in MBs respectively and i and j refer to the MB row and column) and the original full-resolution frame ((MB(I, J), I=0, 1, 2, . . . N-1, J=0, 1, 2, . . . M-1, where M and N are the original frame width and height and I and J are the MB row and column), the relationship is given by:

i (low-resolution row)=[I.(n-1)/(N-1)]

j (low-resolution column)=[J.(m-1)/(M-1)]

where the product of the square brackets [x] denotes the integer value closest to x.

Figure 5:
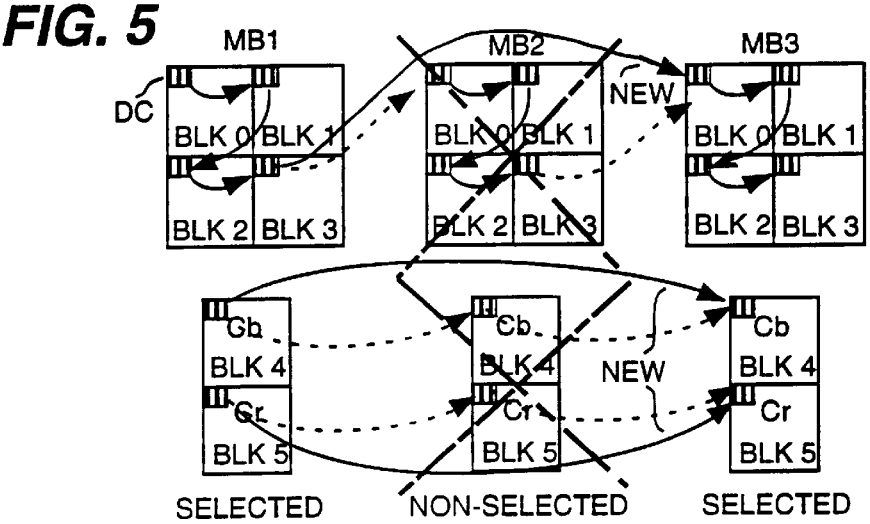
FIG. 5 illustrates the derivation of predicted macroblock DC coefficients.

The low resolution TP I frame utilizes a subset or patch work of macroblocks from the original frame with the remaining non-selected MBs being discarded. FIG. 5 illustrates an exemplary 4:2:0 sampled signal comprising three intra-coded macroblocks MB1, MB2 and MB3, where each comprises blocks 0, 1, 2, 3, 4 and 5. Macroblock 2 is crossed through to illustrate non-use in constructing the reduced resolution TP I frame. The DC coefficients of each luminance and chrominance block are depicted in FIG. 5 with dark stripes. The DC coefficients are predicted from within each macroblock, with the DC coefficient of the first block of an MB being predicted from the last DC coefficient of the immediately preceding MB of the slice. The arrows in FIG. 5 illustrate the prediction sequence. Thus, if the preceding MB, for example, MB 2 of FIG. 5 is not selected, certain DC coefficients must be re-calculated from the newly abutted macroblock, as depicted by arrows NEW of FIG. 5, and re-encoded using DPCM. This re-encoding process is performed as the macroblocks are written to the I-frame memory 110.

If the HDTV video sequence originated from an interlaced scanning source, an optional processing step may be included to remove interlace "flicker" exhibited by frozen interlaced fields containing motion. If the temporal resolution of the reconstructed trick-play stream is such that the same frame (two fields) is displayed for more than one frame period, then such interlaced "flicker" may be very noticeable. In field-coded macroblocks this "flicker" artifact may be eliminated by copying the top two blocks of the macroblock, blocks 0 and 1, to the lower two blocks, blocks 2 and 3. This copying within the macroblock effectively makes both fields the same thus removing any field-to-field motion from the frame. This re-encoding process is performed as the macroblocks are written to the I-frame memory 110.

A further function performed by processing stage 100 is the removal of AC coefficients from each macroblock which cannot be accommodated in the newly constructed TP I-frame due to the low bit-rate available for the trick-play streams. To accomplish this, each block is variable-length-decoded to the point where the block will be padded with zeros, indicating the last coefficient of that block. The number of bits for each block are stored and accumulate in a buffer. The bits are counted and when a count exceeds a predetermined number the remaining AC coefficients are unused or deleted. The number of bits per TP MB depends on the overall rate allowed for each trick-play stream and the temporal resolution or number of frame updates per second.

The block diagram of FIG. 1 illustrates the formation of trick-play data streams having the same allocated bit-rate. If the rate differs significantly between TP speeds, for example, to provide differing resolution at each speed, then the number of AC coefficients retained in I-frame memory 110 will also differ for each speed. Hence I-frame memory 110 cannot be shared and separate I-frame memories may be required for each TP speed or bit rate.

The inventive low-resolution TP I-frame assembled in I-frame memory 110 is coupled to three trick-play stream generation stages; 5 times, block 145; 18 times, block 160 and 35 times block 170. In exemplary FIG. 1, each trick-play stream may be allocated the same bit-rate and temporal resolution, which may represent a preferred configuration. However, not every reconstructed TP I-frame is used for each TP speed. For example, if the I-frame refresh rate in the original stream is once every fifteen frames (M=15) and the temporal resolution used by each trick-play stream is selected to be three, i.e. the number of frame times between frame updates, then for 5 times speed;

(5×speed). (3 frame repeats)/(15 frame refresh)=1.0 thus every TP I-frame will be used. Similarly for 18× and 35× speeds, (18)·(3)/(15)=3.6

(35)·(3)/(15)=7.0

Thus at 18× speed approximately every third or fourth I-frame is used, and at 35× speed every seventh I-frame is used. If it is assumed that the intra-refresh period in an advanced television stream is 0.5 seconds (M=15 for 30 fps source) then a three-frame holding time for 5× speed is the highest possible TP temporal resolution. For simplicity and consistency a three-frame holding time may be used for the remaining TP speeds. A higher temporal resolution of two-frames or single-frame holding time could be used for higher TP speeds since lower temporal resolution at higher speeds may give a false sense of slower than actual trick-play speed. Assuming that the effective trick-play bit-rate is constant, the provision of a higher temporal resolution would consequently require a lower spatial resolution quality.

The reconstructed TP I-frame is read from memory 110 and packaged, according to TP speed, by blocks 145, 160 and 170 which add the appropriate MPEG picture headers and a PES layer. The advanced television transport stream 09 is buffered by buffer 15, which generates signal 10, a transport stream for normal play speed processing. Normal play transport stream 10 is coupled to multiplexor MUX 150. Multiplexor MUX 150 is controlled responsive to recorder 210 servo signals to generate an output bit stream having a sequence which when recorded produces a predetermined track format. The recorded track format is selected to provide the desired recorded TP bit rate and to facilitate specific physical location of speed specific TP I-frame packets within specific recorded tracks. The recorded track format thus facilitates replay at normal speed and at the predetermined trick-play speeds. The TP I-frame packets, 5× signal 121, 18× signal 131 and 35× signal 141, are coupled to multiplexor MUX 150 which inserts the I-frame packets for each TP speed into the normal play transport stream. Thus a valid, MPEG like, transport stream is formatted for record processing by recorder 210 and recording on tape 220.

To minimize TP bit rate, in place of repeated TP I frames, frame repeats or holding times, may be implemented by writing empty P-frames between I frames in the video stream. An empty P-frame results in the decoder predicting from the previous frame, i.e. the TP I frame. Alternatively, frame repeats may be implemented by setting the DSM_trick_mode_flag in the PES layer and calculating the Presentation Time Stamp and Decode Time Stamp PTS/DTS values such that each TP I frame is presented the necessary number of frame times apart. Either frame repeat method produces the same result. However, the second method requires no extra processing of the TP stream on playback and hence, adds no extra cost to the unit. However, the second method requires that the optional DSM_trick_mode—flag is supported in advanced television decoders. With this second method, the extra processing is implemented in the advanced television decoder. Either frame repeat method may implemented during speed specific stream generation in blocks 145, 160 and 170.

The inventive trick-play stream generation techniques described above were employed to produce trick-play speeds of 5×, 18× and 35× with a spatial resolution of 720×480 pixels, and an effective trick-play data rate of 2.0 Mbps. The various trick-play speeds were evaluated and may be summarized by the following points:

Data for each trick-play speed was generated representing independent low-resolution (720×480 pixels), MPEG compatible transport streams.

Each TP stream contains only intra-coded frames thus allowing the same trick-play stream to be used for both Fast Forward and Fast Reverse TP modes.

To retain a 16:9 aspect ratio, the actual spatial image size is sampled to 720×384 pixels, with the remaining area above and below the TP image black.

The temporal resolution is such that a constant three-frame holding time is used resulting in an effective rate of 10 frames per second.

Each I frame of the trick-play streams comprises a selection of sampled macroblocks from the original stream. The bit rate of 2.0M. bits/sec. and three-frame holding time allows most AC coefficients to remain in the selected macroblocks for typical test material.

The overall subjective spatial resolution is fair, being dependent on the amount of motion and image complexity in the source material. A picture rate of 10 fps provides good temporal resolution. The trick-play data stream may be decoded to produce recognizable trick-play video images and hence is acceptable for tape search usage.

Figure 2:
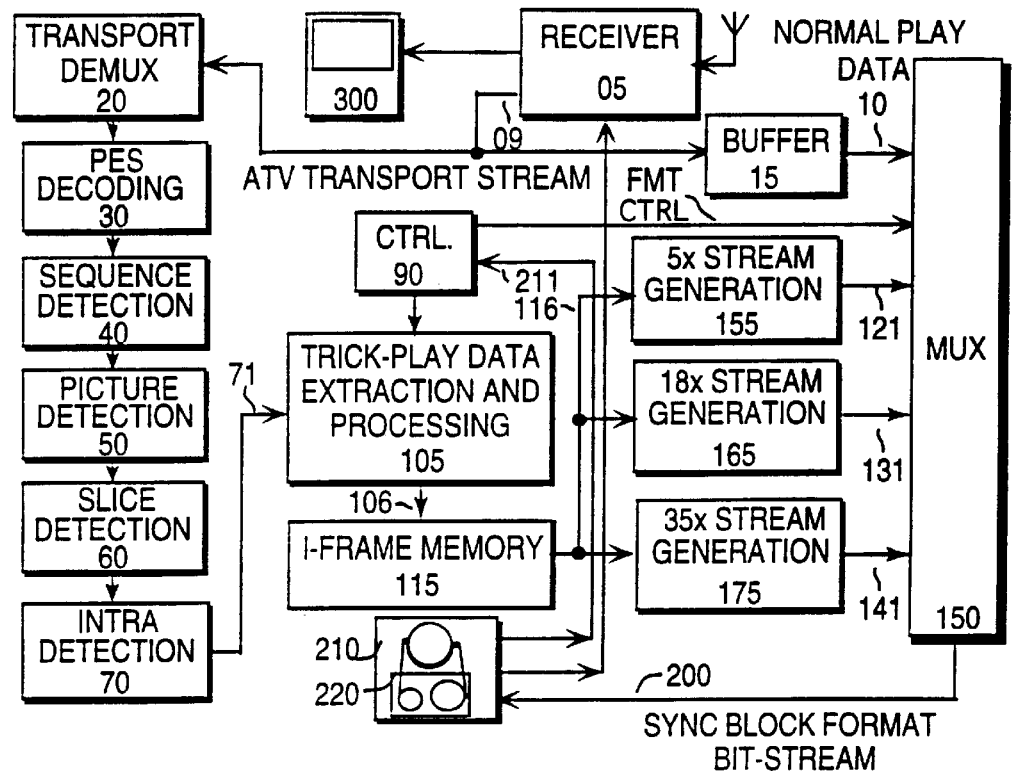
FIG. 2 shows a simplified block diagram of a further inventive system for the real-time generation of a full resolution, "trick-play" data stream.

The inventive low-resolution real-time trick-play mode previously discussed produces recognizable spatial images at a relatively high temporal resolution. However, as already mentioned, this mode may be used if an advanced television receiver/decoder unit is operable at lower resolution, for example, such as that produced by CCIR recommendation 601. However, if operation at a lower resolution is not provided, then trick-play data must be derived having nominally the same spatial resolution, i.e. the same pixel count as the original source. FIG. 2 illustrates an inventive exemplary system for generating full-resolution, real-time trick-play streams. Three trick-play speeds of 5 times, 18 times and 35 times are illustrated. The difference between the full-resolution scheme of FIG. 2 and the low-resolution scheme illustrated in FIG. 1, is in data extraction and processing block 105, and stream generation blocks 155, 165 and 175.

The transport stream decoding and intra detection depicted in blocks 20, 30, 40, 50, 60, and 70 operate and function as described for the low resolution TP system of FIG. 1. As described for the low resolution TP system, the purpose of the data extraction and processing stage, block 105, is to extract only intra information which is required for forming trick-play streams and to perform any processing which is required to guarantee the syntactic and semantic correctness of the resulting TP I-frame. The functionality of block 105 differs from that of block 100 in that the regenerated I-frame must have the same resolution, or pixel count, as the original data stream. Hence, all intra macroblocks are used to reconstruct the new TP I-frame. Since no MBs are deleted, no re-encoding of DC transform coefficients is required.

The major function of processing block 105 is the removal of AC coefficients from each macroblock which, as a consequence of the trick-play bit-rate cannot be accommodated in the new TP I-frame. The low TP channel bit-rate, nominally 2M. bit/sec. forces a trade-off between the number of AC coefficients used, i.e. spatial resolution, and the temporal resolution, or frame update rate of the trick-play stream and the temporal resolution, or frame update rate of the trick-play stream. This spatial versus temporal trade-off was also present in the derivation of the low-resolution stream. However, in a full-resolution frame, i.e. same pixel count, the DC coefficients alone are likely to represent more bits than all the coefficients, both AC and DC assembled in a low-resolution TP frame. Thus any limited inclusion of even a few AC coefficients in each full-resolution macroblock will produce a significant reduction in the temporal resolution, i.e. the frame update time will be lengthened, with more frame repeats. Thus to facilitate constant temporal resolution in full-resolution trick-play streams, a system may employ only the DC coefficients of each macroblock with all AC coefficients being discarded. In addition, discarding the AC coefficients reduces processing complexity since only variable-length decoding of the DPCM value of the DC coefficient is required. FIG. 2 illustrates an exemplary system where each trick-play speed has the same bit rate, and thus the same I-frame memory may be shared between the three TP speeds.

As discussed previously, if the original HDTV video images were generated by interlaced scanning, then an optional processing step may be included to remove interlace "flicker" exhibited by frozen fields containing motion. One such method has already been described. However, since this exemplary high resolution TP system uses only DC transform coefficients, a simpler and more efficient method may be provided by setting the frame_pred_frame_dct flag in the picture_coding_extension section to '1'. This flag indicates that all MBs were frame encoded, thus a previously field-coded block, which could produce 'flicker', is decoded as a frame-coded block. The result is that each field is placed in either the upper or lower portion of a block and any 'flicker' is removed. This method of flicker elimination also reduces the number of bits used in the macroblock_modes section since the dct_type flag can no longer be present if frame_pred_frame_dct_ is set to '1'.

The reconstructed TP I-frame is assembled in memory 115, and coupled to three trick-play stream generation stages, 5 times speed depicted in block 155, 18 times speed in block 165 and 35 times speed in block 175. The exemplary system of FIG. 2 assumes that each trick-play stream has the same effective bit-rate and hence the same approximate temporal resolution. As discussed previously, not every reconstructed TP I-frame is used for each speed. However TP I-frame utilization may be further limited for the following reason. Although each TP I-frame has the same number of coefficients, for example, DC only, each TP I-frame may not have the same number of bits since the DC coefficients are variable length encoded. Therefore, a constant temporal resolution or frame holding time, cannot be fixed for each trick-play stream. Instead the frame holding time will vary slightly over time with the number of bits required to encode or form each TP I-frame. For each trick-play speed, the respective "stream generation" stages, 155, 165 and 175, wait until enough bits have been accumulated in buffer 105 to encode a TP I-frame. Then if the TP I-frame accumulated in the buffer at the time is a new TP I-frame, i.e. one which has not yet been encoded in the specific trick-play speed, the TP I-frame is encoded and the number of bits used will be subtracted from those available. If every I-frame was the same size and each trick play speed was allocated the same effective bit-rate, this scheme would be equivalent to that described for the low-resolution system and the frame refresh period would be constant for all speeds. The reconstructed TP I-frames are read from memory 115 and packaged by stream generators 155, 165 and 175 to form a MPEG compatible transport streams in exactly the same way as detailed for the low-resolution system.

The inventive full spatial resolution trick-play stream generation technique described above was evaluated at an effective trick-play data rate of 2.0 Mbps, for trick-play speeds of 5×, 18× and 35×. The performance may be summarized as follows:

An independent, TP I-frame-only MPEG compatible transport stream may be recorded for each trick-play speed.

The temporal resolution varies with scene complexity and is lower, having longer frame holding times than the low spatial resolution trick-play system previously described. The average and the variation in holding times experienced for typical source material are shown in the following table:

| TP SPEED | AVERAGE HOLDING TIME IN FRAMES | VARIATION IN FRAMES |
|---|---|---|
| 5X | 5 FRAMES | 5–8 FRAMES |
| 18X | 5 FRAMES | 5–8 FRAMES |
| 35X | 5 FRAMES | 5–8 FRAMES |

Note: Because an identical effective trick-play bit-rate is used for all speeds, the temporal resolution will always be similar (if not identical) for each speed.

Each TP I-frame uses only DC coefficients.

The overall quality of spatial resolution is only fair since only DC coefficients are used. The quality of temporal resolution may vary between poor and fair, depending on the level of complexity within the TP encoded material. However, the resulting trick-play images are recognizable and acceptable for tape search usage.

The major differences between real-time trick-play and pre-recorded trick-play data stream derivation, result from the constraints of cost and lack of complexity imposed in a consumer recorder/player. The consumer unit must derive and record the trick-play data stream while recording normal replay data, i.e. the trick-play data stream is derived in real-time. With pre-recorded material, trick-play data streams may be derived directly from an original picture source rather than from a compressed MPEG encoded stream. Speed specific TP data streams may be derived independently of one another and independently from the actual recording event. Thus pre-recorded trick-play data may be derived in non-real time, possibly at non-standard or slower frame repetition rates. Since the constraints of the consumer real-time method no longer apply, the quality of trick-play reproduction achieved by pre-recorded material may be significantly higher.

A first inventive method of pre-recorded TP data derivation provides a spatial resolution of for example, CCIR Rec. 601 having a resolution of 720×480 pixels, regardless of the original HDTV stream resolution. A second inventive method constructs a trick-play stream of the same resolution, i.e. pixel count, as the original HDTV material.

Figure 3:
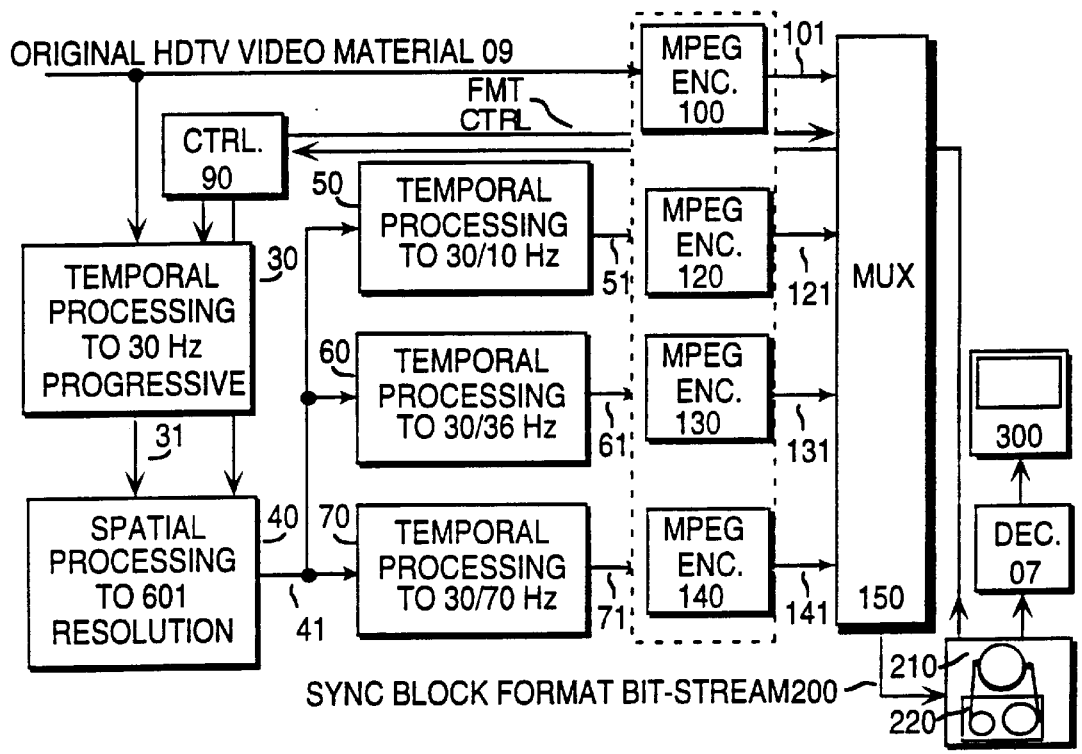
FIG. 3 shows a simplified block diagram illustrating an inventive method for generating low resolution "trick-play" data streams for inclusion in pre-recorded digital records.

FIG. 3 illustrates an exemplary block diagram showing an inventive method for generating low-resolution, pre-recorded trick-play data streams. Regardless of the format of the original HDTV video material 09, temporal processing block 30, performs temporally subsampling which produces a 30 Hz, progressive signal 31. The operation of this stage may differ depending on whether the original source material is progressive with a 59.94/60 Hz frame rate or interlaced with a 29.97/30 Hz frame rate. With progressively scanned source material, the frame rate may be reduced by dropping every second frame from the sequence. By dropping alternate frames a progressive sequence results having half the temporal resolution of the original source material. With interlaced source material, the frame rate remains the same but only one field from each frame is used. This processing results in a progressive sequence of half the vertical resolution and the same frame rate.

The progressively scanned frames, signal 31 is coupled to block 40, which generates a lower resolution signal having, for example, the resolution delivered by CCIR Rec. 601. Each Progressively scanned frame is resampled to 720×384 pixels to retain the 16:9 aspect ratio, and padded with black upper and lower borders to produce a 'letter-box' format of 720×480 pixels.

The HDTV signal is now represented by signal 41, having a lower spatial resolution of 720×480 pixels, progressively scanned with a 30 Hz frame rate. Signal 41 is coupled to blocks 50, 60, 70 which implement speed-dependent temporal subsampling. Each trick-play stream is constructed to have the same temporal resolution or frame holding time of 2 frames, i.e. every frame will be repeated once. Therefore, at N times trick-play speed, the frame rate is reduced from 30 Hz to 30/2N Hz. Thus, the resulting recorded frame rates are as follows, 5× becomes 30/10 Hz, 18× becomes 30/36 Hz and 35× becomes 30/70 Hz. Since every frame is presented twice and the display rate is 30 Hz, the effective speed of scene content remains correct at each TP speed.

The temporal subsampling blocks 50, 60, 70, generate output bit streams 51, 61 and 71 respectively, which are coupled to respective MPEG encoders 120, 130 and 140 to format MPEG compatible bit streams. Since the MPEG compatible encoding is the same for each speed, and because in a pre-recording environment real-time processing is not necessary, the same MPEG encoding hardware may be used to encode the normal-play stream and each trick-play stream. This commonalty of usage is indicated by the broken line enclosing the MPEG encoder blocks 100, 120, 130, and 140. The temporally subsampled bit streams 51, 61 and 71 are MPEG encoded as I-frames. Each I-frame is repeated once by employing the DSM_trick_play_flag, located in the PES layer as described previously. The resulting MPEG compatible streams representing normal play speed NP, stream 101, and trick-play speeds of 5×, stream 121, 18×, stream 131 and 35×, stream 141, are coupled for record formatting by multiplexor 150. Multiplexor 150 effectively selects between the various MPEG streams to generate a sync block format signal 200, suitable for record processing by record replay system 210 and writing to tape 220. As described earlier, the use of predetermined TP speeds allows speed specific TP data to be positioned, or recorded, at specific sync block locations within recorded tracks. Thus multiplexor 150 formats sync block signal 200 to locate speed specific TP I frame data at specific sync block locations within the recorded tracks. These specific locations facilitate reproduction at the various specific TP speeds.

Figure 6:
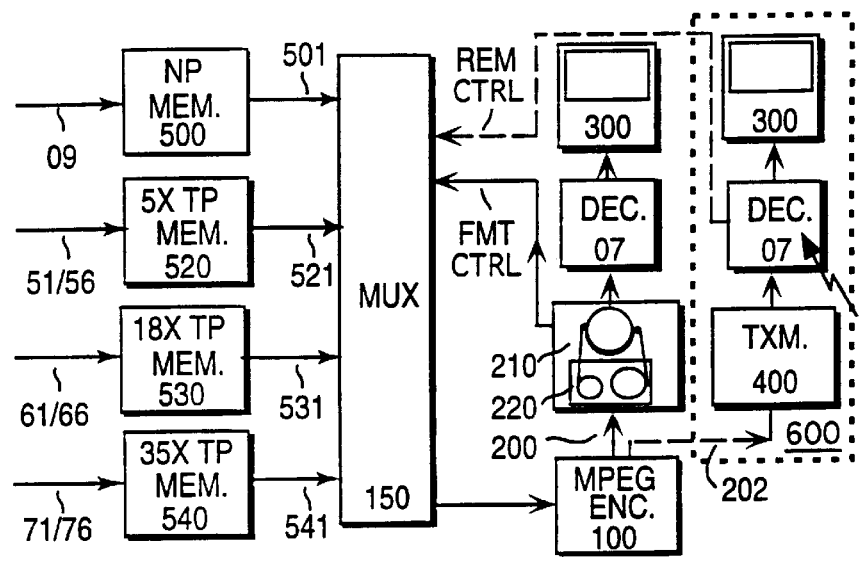
FIG. 6 shows a simplified partial block diagram illustrating a further inventive method for non-real-time generation of pre-recorded records.

FIG. 6 is a partial block diagram illustrating a further inventive arrangement of the non-real-time "trick-play" apparatus of FIG. 3. Speed specifically processed TP signals 51, 61 and 71 are coupled to memories 520, 530 and 540 which store the 5 times, 18 times and 35 times processed digital image signals respectively. The original HDTV signal 09 is also stored in memory 500. Production of the prerecorded media or tape is facilitated by the sequential selection between the various stored digital signal sources to form an output signal which is MPEG encoded by encoder 100 and recorded on the media. A multiplexor 150 is controlled to select between the various digital signal sources to form an output signal for MPEG encoding. The MPEG encoded signal 200 has the various signal components arranged such that a recording may be replayed at normal and trick play speeds. Thus the inventive arrangement of FIG. 6 facilitates the non-real-time, and independent derivation of both normal play and trick play digital signal sources for encoding as MPEG compatible bit streams.

Figure 7:
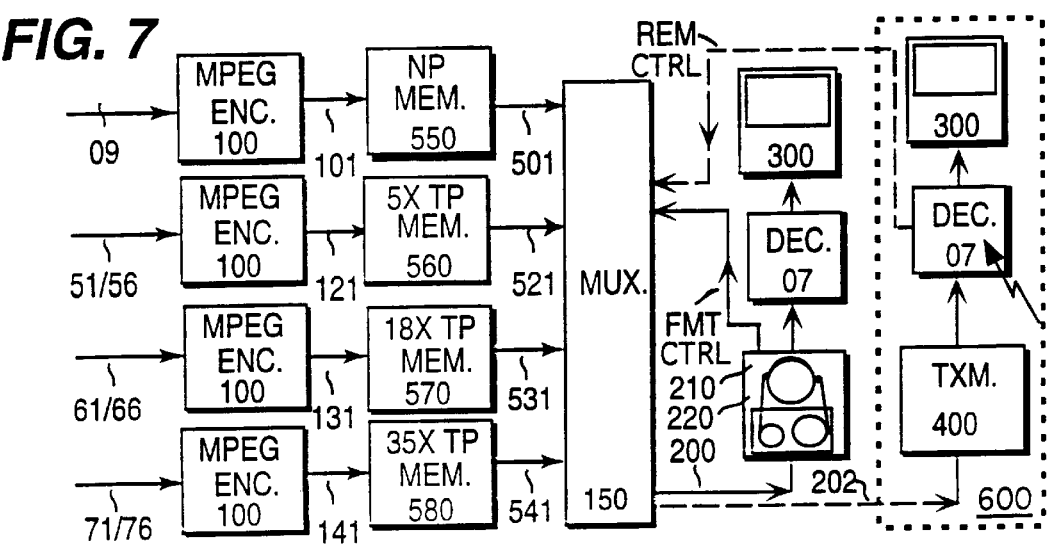
FIG. 7 shows a simplified partial block diagram illustrating another inventive method for non-real-time generation of pre-recorded records.

FIG. 7 is a partial block diagram illustrating another inventive arrangement of the non-real-time "trick-play" apparatus of FIG. 3. In FIG. 7 both normal play and trick play processed digital signals 09, 51, 61 and 71 are coupled for encoding as MPEG compatible bit streams by encoder 100. With non-real-time signal processing and pre-recorded material preparation, signals 09, 51, 61 and 71 may be derived separately and individually coupled for MPEG encoding by a single encoder 100. The individually coded MPEG bit streams 101, 121, 131 and 141 are stored in memories 550, 560, 570 and 580 representing normal play and 5×, 18× and 35× bit streams respectively. Memories 550, 560, 570 and 580 produce output signals 501, 521 531 and 541 which are coupled to multiplexor 150 which is controlled responsive to recorder 210 to generate an MPEG compatible record bit stream formatted such as to provide reproduction at normal play speed and at the predetermined "trick-play" speeds.

The exemplary, low spatial resolution TP system illustrated in FIG. 3, and described above, produces trick-play quality significantly higher than that attainable from real-time derived trick-play streams. The results produced may be summarized as follows.

During recording, an independent, I-frame only, low-resolution (720×480 pixel) MPEG compatible stream is written to tape for each trick-play speed.

The actual spatial image size is 720×384 pixels, to retain 16:9 aspect ratio, presented in a "letter box" format.

The temporal resolution is effectively 15 frames/second for each trick-play speed and produces good to excellent quality which remains constant for each speed.

The spatial resolution produced by a 2.0 Mbps data rate and 720×480 pixels resolution is good to very good, depending on the complexity of the source material.

Overall, the trick-play image quality exhibited with this scheme is very high.

The low-resolution pre-recorded trick-play system shown in FIG. 3 and describe above produces good quality spatial images at a relatively high temporal resolution. However, such a low-resolution method may be used providing the advanced television decoder/receiver unit is able support the lower resolution display format.

Figure 4:
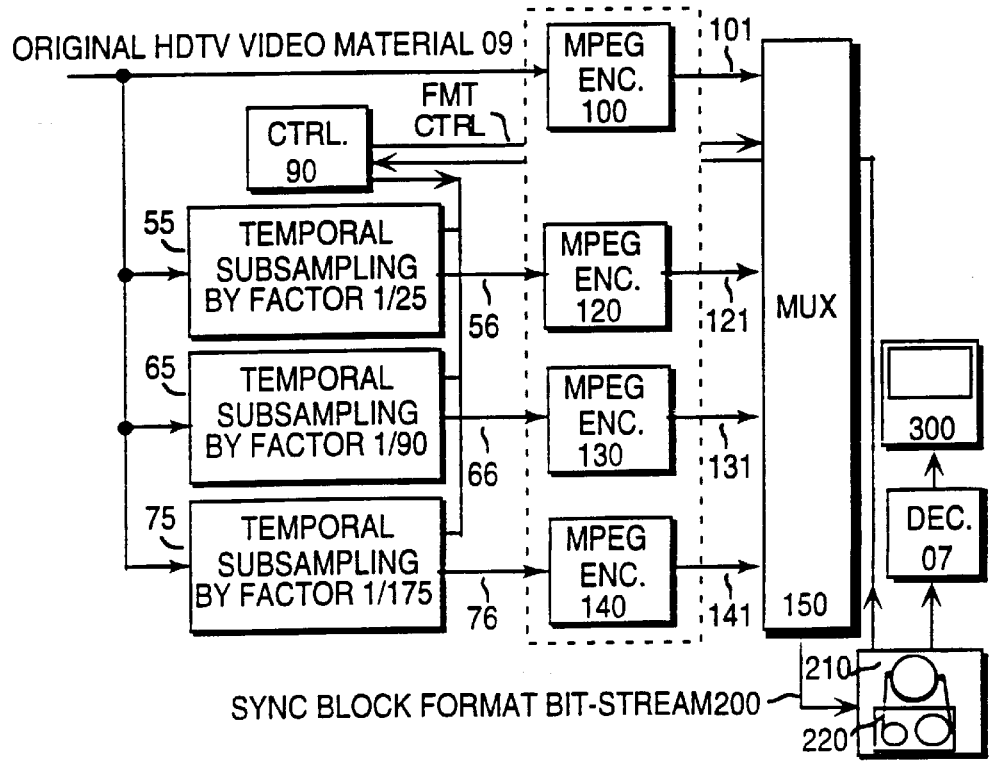
FIG. 4 shows a simplified block diagram illustrating a further inventive method for generating "trick-play" data streams use for inclusion in pre-recorded digital records.

FIG. 4 is an exemplary block diagram of an inventive full-resolution, pre-recorded trick-play stream generation system, providing trick-play speeds of, 5×, 18× and 35×. As previously discussed, pre-recorded trick play data stream derivation may be generated from the original, uncompressed, source material. FIG. 4 illustrates the generation of normal-play and trick-play bit streams, however these may be generated independently of one another, directly from the HDTV source material. Since this system provides full-resolution, no spatial sub-sampling is required and hence less processing is required than that shown in FIG. 3. Since the original, uncompressed, source material may be used, frames which are to be intra-coded may be chosen exactly to suit the trick play speed, rather than selecting I frames from an encoded stream. In addition a constant temporal refresh rate can be maintained, which is more pleasing to the user.

The original HDTV video signal 09 is shown coupled to MPEG encoder 100 which generates an MPEG stream 101 for normal play speed operation. Signal 09 is also coupled for temporal subsampling in blocks 55, 65 and 75 respectively. For a trick-play speed of N times, only every Nth source frame may be utilized for coding. However, depending on a desired trade-off between spatial and temporal resolution, the actual frames used for encoding may be closer to every 5Nth or 8Nth frame in order to provide an acceptable spatial resolution. Hence frame holding times, or temporal resolution, are similar to those of the real-time, full-resolution system described earlier.

Having selected a frame holding or update time, for example, every 5Nth frame for each N times trick-play speed the HDTV stream, signal 09, is temporally sub-sampled for each TP speed. The 5 times TP stream is derived in block 55 which temporally sub-samples by a factor of 1/5N, or 1/25, i.e. 1 frame in 25 is selected to generate output signal 56. Similarly, the 18 times TP stream is derived in block 65, which temporally sub-samples by a factor of 1/5N, or 1/90 and generates output signal 66. The 35 times TP stream is derived in block 75, which temporally sub-samples by a factor of 1/5N, or 1/175 and generates output signal 76. The three sub-sampled TP bit stream signals, 56, 66 and 76 are coupled for MPEG encoding in encoder blocks 120, 130 and 140 respectively.

Since MPEG compatible encoding is the same for each speed, and because real-time processing is not necessary in a pre-recording environment, the same MPEG encoding hardware may be used to encode the normal-play stream and each trick-play stream. This commonalty of usage is indicated by the broken line enclosing the MPEG encoder blocks 100, 120, 130, and 140. The temporally subsampled bit streams 56, 66 and 76 are MPEG encoded as I-frames. Because the frame update time is constant throughout each trick-play stream, so is the number of bits allocated for each I-frame. The frame holding times, or I-frame repeats may implemented by employing the DSM_trick_play_flag as previously described. The resulting MPEG transport streams representing normal play speed NP, stream 101, and trick-play speeds of 5×, stream 121, 18×, stream 131 and 35×, stream 141, are coupled for record formatting by multiplexor 150. Multiplexor 150 effectively selects between the various MPEG streams to generate a sync block format signal 200, suitable for record processing by record replay system 210 and writing to tape 220. As previously described, predetermined TP speeds allow speed specific TP data to be positioned, or recorded, at specific locations within recorded tracks. Thus multiplexor 150 formats sync block signal 200 to locate speed specific TP I frame data at specific sync block locations which facilitate reproduction at the various specific TP speeds.

The inventive arrangements of FIGS. 6 and 7 may also be applied the non-real-time "trick-play" generation arrangement of FIG. 4. As has been described, the arrangements of FIGS. 6 and 7 may facilitate the independent derivation of normal play and trick play digital signals for subsequent formatting and MPEG encoding for pre-recorded tape production or user controlled video on demand service.

The constraints of retaining full spatial and temporal resolution, result in a trick-play quality which is very similar to that achieved by the full-resolution real-time method. However, this pre-recording method has an advantage that the frame holding time is constant. The trick-play stream generation technique described provides trick-play speeds of 5×, 18× and 35×, having full spatial resolution, and an effective trick-play bit rate of 2.0 Mbps. The performance may be summarized as follows:

During recording, an independent, I-frame only, MPEG stream is written to tape for each trick-play speed.

The spatial resolution is the same as the source material.

The temporal resolution is fixed having 5 frame holding time.

Each I-frame uses all DC and some AC coefficients.

The overall spatial quality is fair. Recovered trick-play images are recognizable and are acceptable for tape search purposes.

The following table summarizes trick-play quality achieved by the various inventive methods disclosed.

|  | REAL-TIME TRICK PLAY STREAM GENERATION | NON-REAL-TIME TRICK PLAY STREAM GENERATION |
|---|---|---|
| FULL RESOLUTION TRICK PLAY MODES | SPATIAL QUALITY: poor to fair, only DC coefficients used. | SPATIAL QUALITY: poor to fair, DC & some AC coefficients used. |
|  | TEMPORAL QUALITY: poor to acceptable, variable 5–8 frame holding times | TEMPORAL QUALITY: poor to acceptable, constant 5 frame holding time. |
| LOW RESOLUTION TRICK PLAY MODES | SPATIAL QUALITY: poor to good, depends on material, patchwork of MBs used. | SPATIAL QUALITY: good to very good, depends on material. |
|  | TEMPORAL QUALITY: good, constant 3 frame holding time. | TEMPORAL QUALITY: very good, constant 2 frame holding time. |

In view of the constraints discussed previously, the highest trick-play quality may be achieved, in both real-time and pre-recorded material, by the use of lower-resolution trick-play data. However, the advanced television receiver/decoder must support the use of a low resolution mode. If full-resolution trick-play modes are utilized, the quality provided may be enhanced by manipulation of various parameters. For example, raising the effective bit-rate available for each trick-play speed, will allow an increase in resolution. However, a minimum bit-rate of approximately 2.0 Mbps is required. If the number of "Trick Play" speeds provided is reduced, for example to two in each direction, then the effective bit-rate for each remaining speed may be increased. The effective temporal resolution, or number of frame repeats, results from the trade-off between temporal and spatial resolution. Hence either parameter may be optimized depending on the desired application.

What is claimed is:

1. A method for generating an MPEG compatible digital image representative signal which when recorded facilitates reproduction at more than one speed, said method comprising the steps of:

a) identifying a subset of intra-coded macroblocks in a data stream comprising an MPEG compatible digital image representative signal;

b) decoding said subset of intra-coded macroblocks to extract intra-coded data;

c) storing a first set of specific coefficients selected from said extracted intra-coded data to form a first stream of reduced bit rate intra-coded frames;

d) generating a first number of said first set of reduced bit rate intra-coded frames to define a first trick play speed;

e) multiplexing said first stream of reduced bit rate intra-coded frames with said data stream at a rate related to said first trick play speed to produce a new bit stream for recording a full resolution version of said digital image representative signal together with a first trick play speed reduced resolution version of said digital image representative signal; and, f) recording said new bit stream.

2. The method of claim 1, further comprising the step of using only DC discrete cosine transform coefficients from said decoded subset of intra-coded macroblocks in said storing step.

3. The method of claim 1, further comprising the steps of:

retaining and discarding different ones of said intra-coded macroblocks from said data stream based upon a mathematical function; and, extracting said intra-coded data only from said retained ones of said intra-coded macroblocks.

4. The method of claim 1, further comprising the steps of:

retaining and discarding different ones of said intra-coded macroblocks from said data stream based upon entries in a look-up table; and, extracting said intra-coded data only from said retained ones of said intra-coded macroblocks.

5. The method of claim 1, further comprising the steps of:

storing a second set of specific coefficients selected from said extracted intra-coded data to form a second stream of reduced bit rate intra-coded frames;

generating different numbers of said first and second reduced bit rate intra-coded frames to define said first trick play speed and to define a second trick play speed; and, multiplexing said first and second streams of reduced bit rate intra-coded frames with said data stream at different rates related to said first and second trick play speeds to produce a new bit stream for recording a full resolution version of said digital image representative signal together with said first trick play speed reduced resolution version of said digital image representative signal and a second trick play speed reduced resolution version of said digital image representative signal.

6. The method of claim 5, further comprising the steps of:

retaining and discarding different ones of said intra-coded macroblocks from said data stream based upon at least one of a mathematical function and entries in a look-up table;

extracting said intra-coded data only from said retained ones of said intra-coded macroblocks; and, using only DC discrete cosine transform coefficients from said retained and decoded subset of intra-coded macroblocks in said storing steps.

7. The method of claim 1, further comprising the steps of:

predicting the DC coefficient of a given macroblock from the DC coefficient of a macroblock immediately preceding said given macroblock; and, when said immediately preceding macroblock is not a part of said subset, recalculating the DC coefficient of said given macroblock from the DC coefficient of a macroblock in said subset immediately preceding said given macroblock.

* * * * *